(12) United States Patent
Mordukhovich et al.

(10) Patent No.: US 8,371,262 B2
(45) Date of Patent: *Feb. 12, 2013

(54) METHOD AND APPARATUS TO REMOVE A FLUIDIC CONTAMINANT FROM LUBRICATING OIL

(75) Inventors: Gregory Mordukhovich, Bloomfield Hills, MI (US); James L. Linden, Rochester Hills, MI (US); Andrew M. Mance, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 585 days.

This patent is subject to a terminal disclaimer.

(21) Appl. No.: 12/578,810

(22) Filed: Oct. 14, 2009

(65) Prior Publication Data

US 2011/0083651 A1 Apr. 14, 2011

(51) Int. Cl.
  *F01M 3/04* (2006.01)
  *F01M 11/03* (2006.01)
  *F02B 25/06* (2006.01)
  *B01D 61/00* (2006.01)

(52) U.S. Cl. ............... 123/196 A; 123/573; 210/167.02; 210/651

(58) Field of Classification Search ............. 123/196 A, 123/573; 210/167.02, 651; 184/6.24
See application file for complete search history.

(56) References Cited

U.S. PATENT DOCUMENTS

| | | | | |
|---|---|---|---|---|
| 1,955,822 A * | 4/1934 | McKinley | ............... | 123/196 A |
| 6,161,529 A * | 12/2000 | Burgess | ............... | 123/572 |
| 6,557,533 B2 * | 5/2003 | Katayama et al. | ............. | 123/516 |
| 6,810,861 B2 * | 11/2004 | Itakura et al. | ................ | 123/516 |
| 7,028,673 B2 * | 4/2006 | Itou et al. | ...................... | 123/516 |
| 7,543,573 B2 * | 6/2009 | Olree | ............ | 123/518 |
| 2006/0236984 A1 * | 10/2006 | Reddy | ............. | 123/518 |
| 2009/0126700 A1 * | 5/2009 | Weller | ............ | 123/518 |
| 2009/0196968 A1 * | 8/2009 | Bratton et al. | ............. | 426/417 |
| 2011/0062082 A1 * | 3/2011 | Mordukhovich et al. | ..... | 210/651 |
| 2011/0084010 A1 * | 4/2011 | Mordukhovich et al. | ........ | 210/167.04 |

* cited by examiner

*Primary Examiner* — Nathaniel Wiehe
*Assistant Examiner* — Tea Holbrook

(57) ABSTRACT

A device for removing a fluidic contaminant from engine oil in an internal combustion engine includes a fluid absorbing element having a mounting element and a fluid absorption media assembled into a sump of a crankcase of the internal combustion engine. A first portion of the fluid absorption media is immersed within the engine oil contained in the sump when the engine is not operating and a second portion of the fluid absorption media is exposed to ambient air contained in a head space of the crankcase. The fluid absorption media is configured to absorb a fluidic contaminant in the engine oil during a period when the engine is not operating and to desorb the absorbed fluidic contaminant.

13 Claims, 1 Drawing Sheet

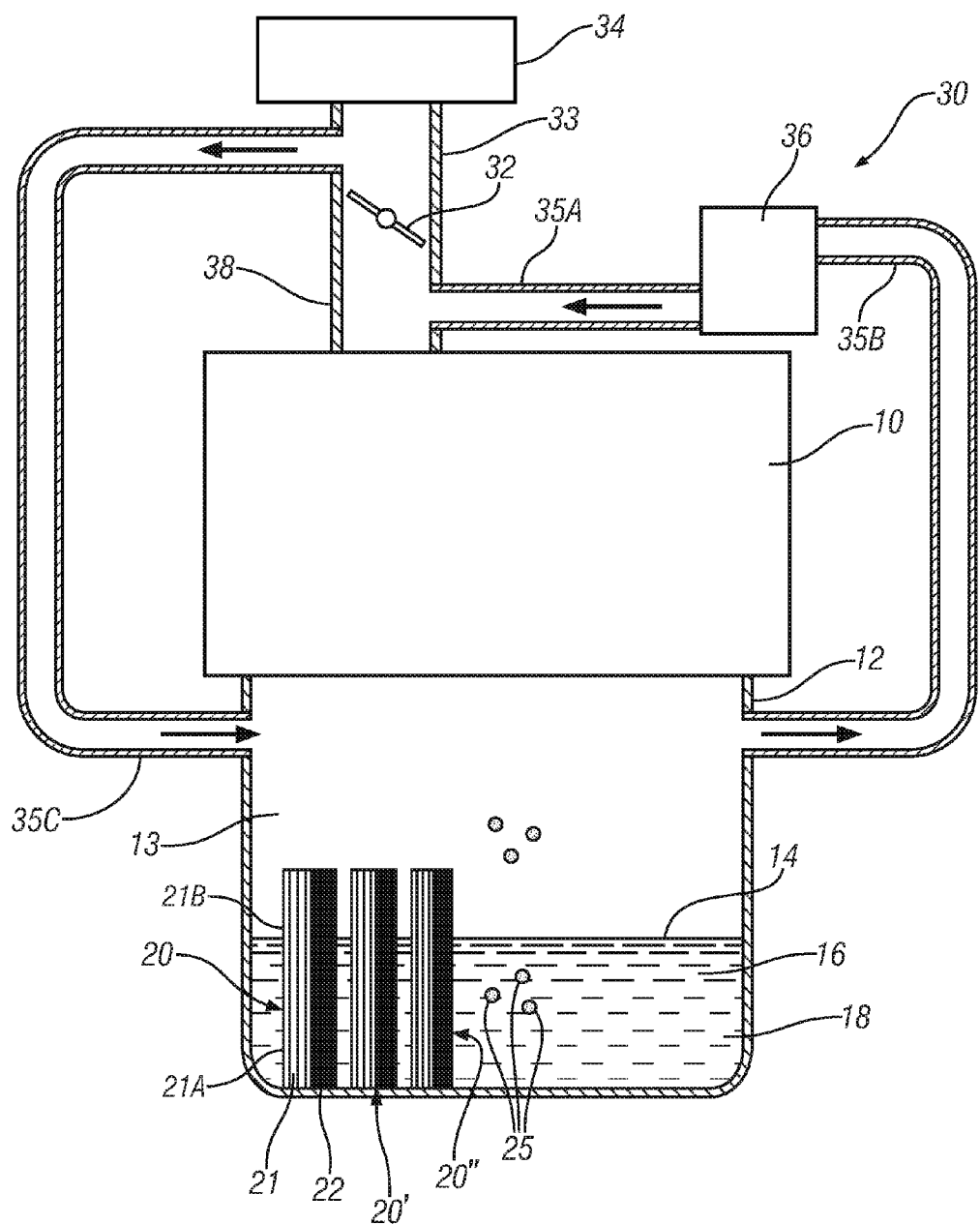

METHOD AND APPARATUS TO REMOVE A FLUIDIC CONTAMINANT FROM LUBRICATING OIL

TECHNICAL FIELD

This disclosure is related to an internal combustion engine and associated oil lubricating system.

BACKGROUND

The statements in this section merely provide background information related to the present disclosure and may not constitute prior art.

Combustion in internal combustion engine systems generates combustion gases, a portion of which can be forced passed engine pistons to an engine crankcase, in a process referred to as blow-by. Combustion gases that blow-by pistons end up in the engine crankcase. A portion of the combustion gases in the engine crankcase can be recirculated into the engine intake system via a crankcase ventilation process, whereby they are burned during combustion. A portion of the combustion gases in the engine crankcase can precipitate and be absorbed into the engine oil, thus affecting lubricity of the engine oil and reducing service life of the engine oil. The condensed combustion gases contained in crankcase oil can include fluidic contaminants in the form of unburned fuel and combustion components, e.g., hydrocarbons, alcohols (ethanol and methanol), and water. Presence and amount of fluidic contaminants can affect lubricity and service life of engine oil.

Known oil filter devices remove solid contaminants from engine oil prior to circulating the engine oil to engine components including crankshaft bearings, camshaft bearings, lifters, and pistons. Engine systems include oil pumps that pump pressurized oil through the oil filter device. Known engine oil filter devices include prefiltering elements including mesh stainless steel screens to remove large solid contaminants. Known engine oil filters include filtering elements including cotton fibrous filter elements to remove smaller solid contaminants. Known engine oil filters include magnetized elements for removing ferrous particles contained in the oil.

SUMMARY

A device for removing a fluidic contaminant from engine oil in an internal combustion engine includes a fluid absorbing element having a mounting element and a fluid absorption media assembled into a sump of a crankcase of the internal combustion engine. A first portion of the fluid absorption media is immersed within the engine oil contained in the sump when the engine is not operating and a second portion of the fluid absorption media is exposed to ambient air contained in a head space of the crankcase. The fluid absorption media is configured to absorb a fluidic contaminant in the engine oil during a period when the engine is not operating and to desorb the absorbed fluidic contaminant.

BRIEF DESCRIPTION OF THE DRAWING

One or more embodiments will now be described, by way of example, with reference to the accompanying FIGURE, which is a two-dimensional schematic diagram in accordance with the present disclosure.

DETAILED DESCRIPTION

Referring now to the FIGURE, the showings are for the purpose of illustrating certain exemplary embodiments only and not for the purpose of limiting the same. The FIGURE schematically illustrates an embodiment of an absorbing element 20 configured to absorb a fluidic contaminant 25 in engine oil 16 in a crankcase 12 of an internal combustion engine 10. The fluidic contaminant 25 is depicted as a single element, and can include one or more of hydrocarbons, alcohols, e.g., ethanol and methanol, and water.

The absorbing element 20 is preferably assembled into a sump 18 of the crankcase 12 and is partially immersed in the engine oil 16. Like numerals refer to like elements in the various embodiments. Each of the multiple absorbing elements 20, 20' and 20" is associated with absorbing a different one of the fluidic contaminants 25, e.g., one of hydrocarbons, alcohols, e.g., ethanol and methanol, and water.

The internal combustion engine 10 includes the crankcase 12, a throttle 32, air filtering system 34, intake plenum 38, and a positive crankcase ventilation (PCV) system 30. The crankcase 12 includes a sump 18 for capturing engine oil 16 during engine operation and a head space 13 that is above an oil level 14. The oil level 14 as shown depicts the level of oil 16 in the crankcase 12 subsequent to discontinuing operation of the engine 10 and permitting excess oil to drain from various locations in the engine 10 into the crankcase 12. A skilled practitioner understands that the oil level 14 varies, including decreasing during operation of the engine 10 as a result of oil 16 being pumped through an oil filter to lubricate various locations in the engine.

The PCV system 30 includes a first conduit 35A that fluidly connects the intake plenum 38 and a PCV valve 36, a second conduit 35B that fluidly connects the PCV valve 36 and the head space 13 of the crankcase 12, and a third conduit 35C that fluidly connects an air duct 33 between the air filtering system 34 and the throttle 32 to the head space 13 of the crankcase 12. Operation of the PCV system 30 is as follows. During engine operation, vacuum generated in the plenum 38 associated with operation of the engine 10 creates a flow path through the first conduit 35A to the PCV valve 36, through the second conduit 35B to the head space 13 of the crankcase 12, through the third conduit 35C to the air duct 33 between the air filtering system 34 and the throttle 32. In this operation, gases in the head space 13 are drawn into the intake plenum 38 to be combusted during engine operation, and filtered intake air is circulated into the head space 13 to displace the gases therein.

The absorbing element 20 includes a unitary piece of a fluid absorption media 21 that is preferably fixedly attached to a mounting element 22, e.g., a piece of aluminum that is attached to the crankcase 12. The fluid absorption media 21 includes a first portion 21A and a second portion 21B. The oil level 14 distinguishes the first portion 21A from the second portion 21B. The first portion 21A of the fluid absorption media 21 is immersed within the oil 16 contained in the sump 18 when the engine 10 is not operating, and the second portion 21B of the fluid absorption media 21 is preferably exposed to ambient air contained in the head space 13 of the crankcase 12.

The fluid absorption media 21 removes one or more fluidic contaminants 25 from the engine oil 16. Preferably, the first portion 21A of the fluid absorption media 21 absorbs the fluidic contaminant 25 present in the engine oil 16 during a period when the engine 10 is not operating. The fluid absorption media 21 wicks the absorbed fluidic contaminant 25 from the first portion 21A to the second portion 21B of the fluid absorption media 21. As used herein, the term 'wick' means to convey liquid by capillary action through the fluid absorption media 21. Preferably, the second portion 21B of the fluid absorption media desorbs the absorbed fluidic contaminant 25 during subsequent operation of the engine 10.

The absorbing element 20 is configured to remove a specific fluidic contaminant 25 contained in crankcase oil, including those resulting from in-cylinder combustion and cylinder blow-by. During engine operation, oil contaminants including one or more fluidic contaminants 25 can be introduced into the engine oil 16.

The fluidic contaminant 25 may be in a gaseous or aerosol form when entering the head space 13 of the crankcase 12. For purposes of the disclosure, a fluidic contaminant 25 is a non-oil element that precipitates to a liquid form at ambient temperatures, e.g., between 50° C. and 0° C. One or more fluidic contaminants 25 may be found in the crankcase 12. Fluidic contaminants 25 include fuel and combustion components, including, e.g., hydrocarbon fuels, alcohols (ethanol and methanol), and water. Fluidic contaminants 25 can pass engine piston rings during combustion. When not operating, the engine 10 loses heat and cools to ambient temperatures. Oil drains out of oil galleys to the crankcase 12. The fluidic contaminants 25 present in the head space 13 of the crankcase 12 condense and mix with engine oil 16 in the crankcase 12. The absorbing element 20 absorbs a specific fluidic contaminant 25 contained in the oil 16 in the crankcase 12.

During subsequent operation of the engine 10, when the temperature of the engine oil 16 exceeds a predetermined temperature associated with the specific fluidic contaminant 25 contained on the second portion 21B of the fluid absorption media 21 and exposed to ambient air contained in the head space 13 of the crankcase 12, the absorbed fluidic contaminant 25 evaporates out of the second portion 21B of the fluid absorption media 21 and becomes airborne in the crankcase 12. The predetermined temperature associated with the fluidic contaminant 25 is the evaporative temperature of the fluidic contaminant 25. Thus, when the fluidic contaminant 25 is water, when the temperature of the engine oil 16 reaches the evaporative temperature of 100° C. under standard conditions, the water evaporates and is ejected into the head space 13 of the crankcase 12, where it can be circulated into the intake plenum 38 by way of the PCV system 30 and expelled through the engine exhaust.

Thus, when the fluidic contaminant 25 is alcohol, e.g., ethanol or methanol, when the temperature of the engine oil 16 reaches the evaporative temperature of 79° C. under standard conditions, the alcohol evaporates and is ejected into the head space 13 of the crankcase 12, where it can be circulated into the intake plenum 38 by way of the PCV system 30 and burned during combustion.

Thus, when the fluidic contaminant 25 is hydrocarbon fuel, when the temperature of the engine oil 16 reaches the evaporative temperature of the specific hydrocarbon, the fuel evaporates and is ejected into the head space 13 of the crankcase 12, where it can be circulated into the intake plenum 38 by way of the PCV system 30 and burned during combustion.

The absorption media 21 removes one of the fluidic contaminants 25 from the lubricating oil. The absorption media 21 preferably includes absorption media including cellulose fiber, silica gel and/or aluminum oxide disbursed on a substrate and installed as has been described. Exemplary silica gel has a particle size range between 75 and 250 microns (Mesh 200-60). One example volume of the silica gel is 4 g. Exemplary aluminum oxide has a particle size range between 75 and 250 microns (Mesh 200-60). An example volume of the aluminum oxide is 4 g. In one embodiment, the filtering element can include a cellulose fiber substrate having one of aluminum oxide and silica gel disbursed thereon.

A non-limiting embodiment of the absorbing element 20 including the fluid absorption media 21 fixedly attached to the mounting element 22 including first portion 21A immersed within the oil 16 and the second portion 21B exposed to ambient air contained in the head space 13 of the crankcase 12 includes the internal combustion engine 10 used to generate electric power on an extended-range electric vehicle. This embodiment facilitates removal of the fluidic contaminants 25 from the engine oil 16 and subsequent recirculation using the PCV system 30 during intermittent and relatively short operating periods associated with operation of extended-range electric vehicle, thus maintaining oil lubricity and extending oil life.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A device for removing a fluidic contaminant from engine oil in an internal combustion engine, comprising:
    a fluid absorbing element comprising a mounting element and a fluid absorption media assembled into a sump of a crankcase of the internal combustion engine,
    a first portion of the fluid absorption media immersed within the engine oil contained in the sump when the engine is not operating;
    a second portion of the fluid absorption media exposed to ambient air contained in a head space of the crankcase;
    the fluid absorption media configured to absorb a fluidic contaminant in the engine oil during a period when the engine is not operating; and
    the fluid absorption media configured to desorb the absorbed fluidic contaminant.

2. The device of claim 1, further comprising:
    the first portion of the fluid absorption media configured to absorb the fluidic contaminant in the engine oil when the engine is not operating;
    the fluid absorption media configured to wick the absorbed fluidic contaminant to the second portion of the fluid absorption media; and
    the second portion of the fluid absorption media configured to desorb the absorbed fluidic contaminant.

3. The device of claim 2, wherein the second portion of the fluid absorption media is configured to desorb the absorbed fluidic contaminant when the engine is operating.

4. The device of claim 3, wherein the absorbed fluidic contaminant desorbs from the second portion of the fluid absorption media when the engine oil achieves an evaporative temperature of the fluidic contaminant.

5. The device of claim 3, further comprising the engine including a positive crankcase ventilation system configured to circulate the desorbed fluidic contaminant into an intake system of the engine when the engine is operating.

6. The device of claim 1, wherein the fluid absorption media comprises silica.

7. The device of claim 1, wherein the fluid absorption media comprises aluminum oxide.

8. The device of claim 6, wherein the wherein the silica has a particle size between 75 and 250 microns.

9. The device of claim 7, wherein the aluminum oxide has a particle size range between 75 and 250 microns.

10. A method for removing a fluidic contaminant from engine oil in an internal combustion engine, comprising:

assembling a fluid absorbing element into a sump of a crankcase of the internal combustion engine, the fluid absorbing element including a first portion and a second portion, the first portion immersed in the engine oil contained in the sump when the engine is not operating and the second portion of the fluid absorbing element exposed to ambient air contained in a head space of the crankcase;

absorbing a fluidic contaminant in the engine oil onto the first portion of the fluid absorbing element;

wicking the absorbed fluidic contaminant to the second portion of the fluid absorbing element; and desorbing the fluidic contaminant from the second portion of the fluid absorbing element.

11. The method of claim 10, wherein absorbing the fluidic contaminant in the engine oil onto the first portion of the fluid absorbing element comprises absorbing when the engine is not operating.

12. The method of claim 10, wherein desorbing the fluidic contaminant from the second portion of the fluid absorbing element comprises desorbing when the engine is operating.

13. The method of claim 12, further comprising desorbing the absorbed fluidic contaminant from the second portion of the fluid absorbing element when the engine is operating by circulating the desorbed fluidic contaminant into an intake system of the engine using a positive crankcase ventilation system.

* * * * *